United States Patent [19]

Ekkert

[11] Patent Number: 5,368,469
[45] Date of Patent: Nov. 29, 1994

[54] APPARATUS FOR MOLDING CLOSURES HAVING TAMPER EVIDENT BANDS

[75] Inventor: Len Ekkert, Lemont, Ill.

[73] Assignee: Phoenix Closures, Inc., Naperville, Ill.

[21] Appl. No.: 112,683

[22] Filed: Aug. 26, 1993

[51] Int. Cl.⁵ .............................................. B29C 45/44
[52] U.S. Cl. ..................................... 425/556; 425/577;
425/436 R; 425/436 RM; 425/441; 425/444;
425/DIG. 58; 249/52; 249/59; 249/184
[58] Field of Search ............... 249/59, 52, 66.1, 181,
249/184; 425/577, DIG. 58, 441, 436 R, 444,
556, 436 RM, 468

[56] References Cited

U.S. PATENT DOCUMENTS

| | | |
|---|---|---|
| 2,875,472 | 3/1959 | Marcus . |
| 3,737,268 | 6/1973 | Ryder . |
| 3,940,103 | 2/1976 | Hilaire . |
| 4,052,033 | 10/1977 | Taylor . |
| 4,125,246 | 11/1978 | Von Holdt ........................ 425/441 |
| 4,533,312 | 8/1985 | Von Holdt .................. 425/DIG. 58 |
| 4,541,795 | 9/1985 | Cole ................................... 425/437 |
| 4,552,328 | 11/1985 | Dutt et al. ........................... 249/59 |
| 4,570,897 | 2/1986 | Von Holdt .......................... 249/59 |
| 4,618,121 | 10/1986 | Conti ................................... 249/59 |
| 4,648,834 | 3/1987 | Von Holdt ................. 425/DIG. 58 |
| 4,676,732 | 6/1987 | Letica ......................... 425/DIG. 58 |
| 4,881,892 | 11/1989 | Webster et al. .................... 249/59 |
| 4,913,299 | 4/1990 | Petro .................................. 215/330 |
| 5,053,182 | 10/1991 | Hedgewick . |
| 5,066,448 | 11/1991 | Chlebina et al. . |
| 5,114,655 | 5/1992 | Cole ................................... 249/59 |
| 5,230,856 | 7/1993 | Schellenbach ............. 425/DIG. 58 |
| 5,281,385 | 1/1994 | Julian ......................... 425/DIG. 58 |

FOREIGN PATENT DOCUMENTS

| | | | |
|---|---|---|---|
| 55-152034 | 11/1980 | Japan .................................. 425/441 |
| 897540 | 1/1982 | U.S.S.R. ............................. 425/441 |

*Primary Examiner*—Khanh Nguyen
*Attorney, Agent, or Firm*—Welsh & Katz, Ltd.

[57] ABSTRACT

An apparatus for molding a tamper evident closure having a top, an annular skirt depending from the top, and a breakaway band secured to an underside of the skirt by a plurality of bridges includes a mold frame, a cavity portion releasably secured to the frame and configured for forming an outer surface of the closure, a core portion nestable into the cavity portion and mounted on the frame for reciprocal axial movement relative to the cavity portion, a slide portion mounted to the frame for reciprocal movement transverse to the axial movement of the core portion between a closed position and an open position, and a stripper device located on the frame for disengaging molded closures retained on the slide portion as the slide portion moves from the closed position to the open position.

10 Claims, 3 Drawing Sheets

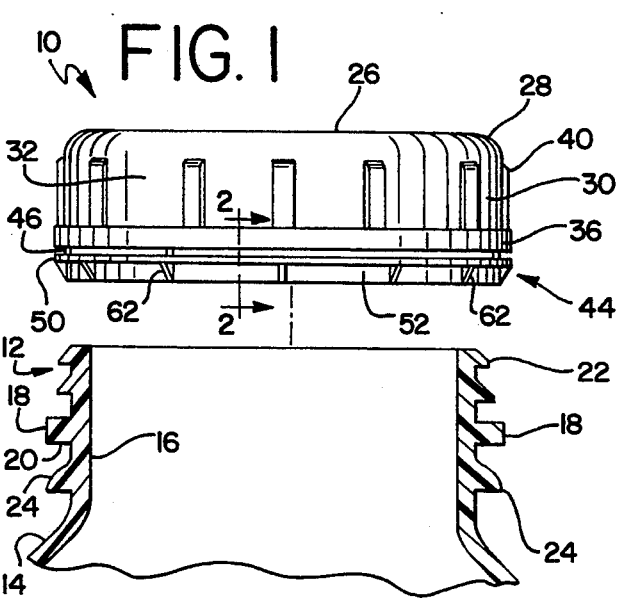
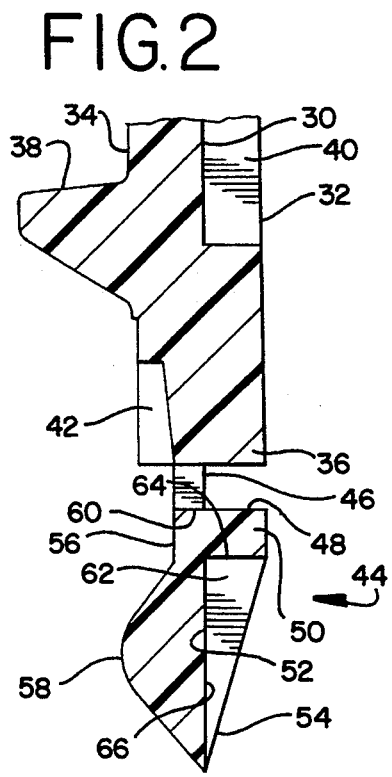
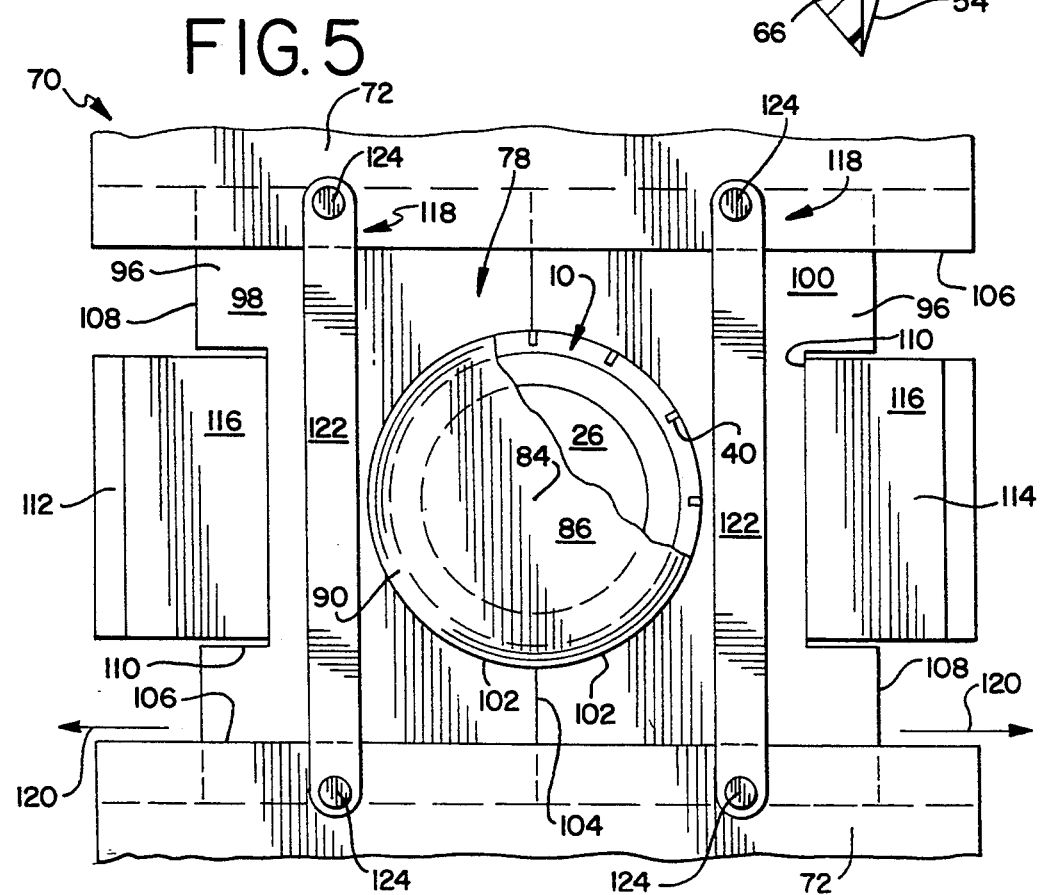

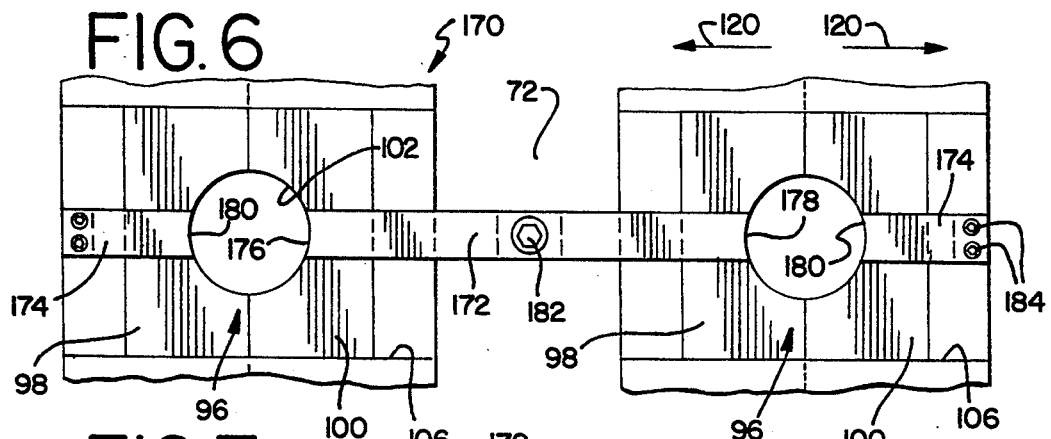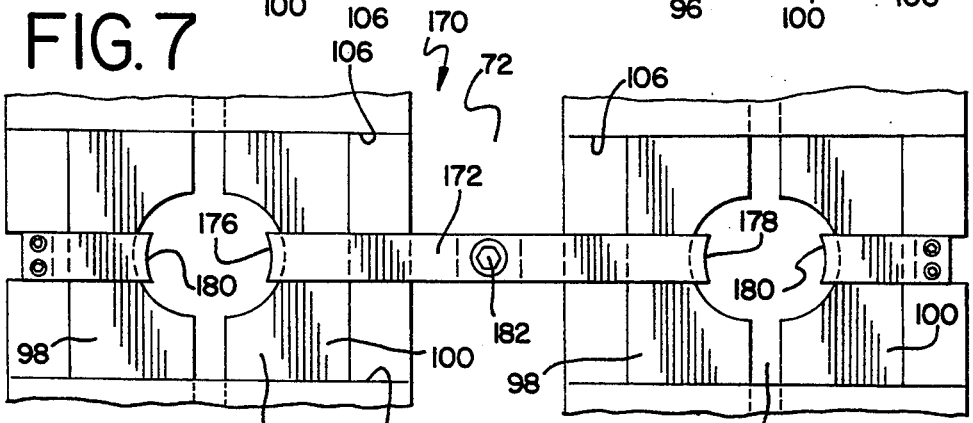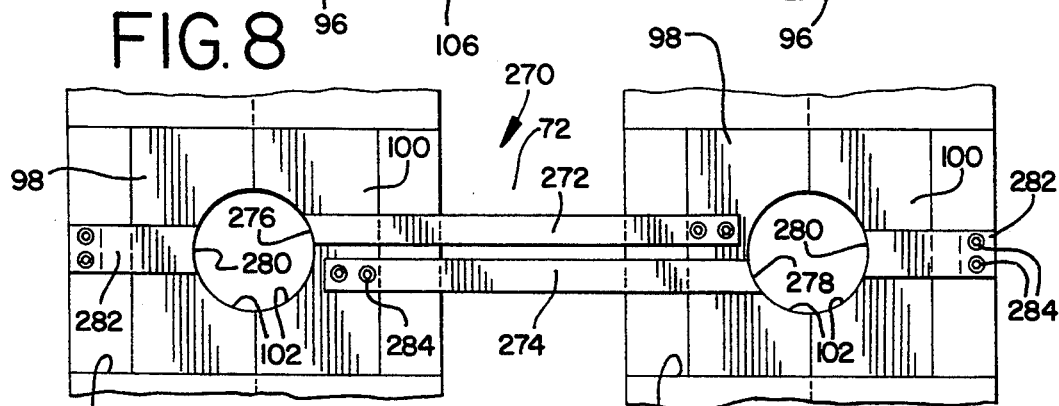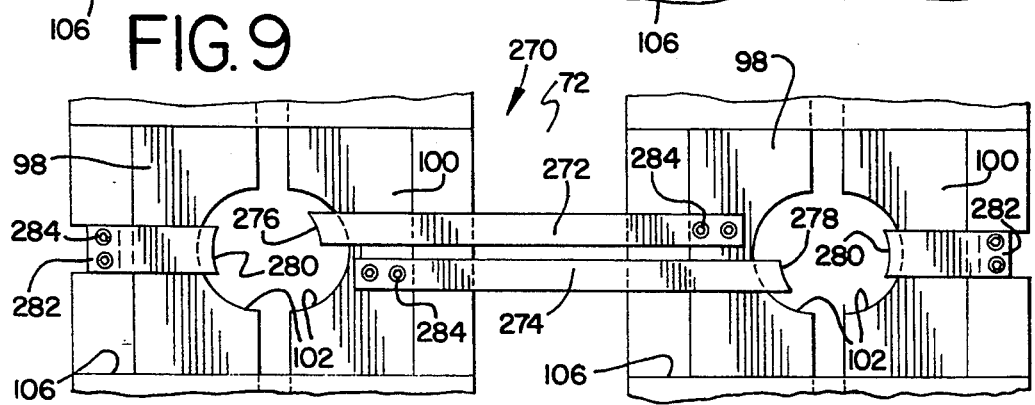

APPARATUS FOR MOLDING CLOSURES HAVING TAMPER EVIDENT BANDS

BACKGROUND OF THE INVENTION

The present invention relates generally to devices for molding container closures, particularly by injection molding, and specifically to an apparatus for molding closures having tamper evident or so-called breakaway bands.

Tamper evident closures employing breakaway bands are commonly used on relatively small-necked containers such as plastic milk bottles and motor oil bottles. There has been a demand, particularly among food processors and packagers, as well as manufacturers of agricultural pesticides, for visually distinctive tamper evident container closures for bottles having relatively larger neck diameters on the order of 2.5–3.0 inches (63 mm). Packagers in these industries are particularly vulnerable to counterfeit packages or look-alike packages containing inferior counterfeit products. Visually distinctive closures are considered to be harder to reproduce by counterfeiters, and as such are thought to deter counterfeiting.

Furthermore, there has been a demand among food processors for a replacement for the traditional metal cap and peal-off foil or plastic seals commonly found on large-mouthed containers of mayonnaise, salad dressing and similar foodstuffs. Such containers are expensive to package in that the seal material is costly, as is the two-step assembly operation (closure and seal are separately applied).

In addition, relatively wide-mouthed containers are also susceptible to backing off or gradual unthreading of conventional closures from the container neck or finish during packaging and shipping. Commonly-assigned U.S. Pat. No. 4,913,299 discloses a closure and container having an anti-backoff system of peripherally projecting teeth on the container neck and a corresponding plurality of spaced recesses on the lower edge of the closure skirt which engage the teeth and thus prevent unwanted unthreading of the closure. Although satisfactory in preventing backing off of the closure, due to shortcomings of conventional molding machinery, the closure of the above-identified patent has not been provided with a tamper evident feature such as a breakaway band.

There has been a demand in the food and pesticide industries, among others, for providing such a closure with a breakaway band to obtain the desired anti-counterfeiting properties. However, closure manufacturers have been unable to supply such a closure due to the significant difficulty in efficiently molding the many undercuts inherent with a combination of the anti-backoff recesses and a breakaway band. Such operations were unavailable through conventional injection molding presses, regardless of whether they were of the commonly known stripper type or the unscrewing type.

In commonly-assigned U.S. patent application Ser. No. 973,029, filed Nov. 6, 1992, which is incorporated herein by reference, there is disclosed a tamper evident closure having both a breakaway band and an anti-backoff feature. In order to more efficiently mass produce the closure of that invention, the above-identified difficulties in molding technology needed to be overcome.

A specific difficulty encountered in the molding of closures having both anti-backoff features and a breakaway band is that, due to the several undercut formations on the closure, mold slides are required. Upon the completion of each molding cycle, it has been found that finished closures often adhere to the mold slides, requiring some sort of supplemental removal operation. Removal of the stuck closures must be accomplished by hand, which slows production.

Thus, a major object of the present invention is to provide a molding apparatus for a tamper evident closure constructed so that the finished closures do not remain attached to the mold slide.

A further object of the present invention is to provide a molding apparatus for a closure having a breakaway band as well as an anti-backoff feature.

Another object of the present invention is to provide a molding apparatus for tamper evident closures which is readily convertible from molding closures with an anti-backoff feature to closures not having such feature.

SUMMARY OF THE INVENTION

Accordingly, the above-listed objects are met or exceeded by providing a molding apparatus which includes a stripper device for removing retained molded closures from the mold slide. The stripper device operates in a transverse direction relative to the reciprocating axial movement of the mold core. Furthermore, an advantage of the present stripper device is that it is a relatively inexpensive and uncomplicated solution to an otherwise labor-intensive procedure for producing such relatively complicated closures.

More specifically, the present invention provides an apparatus for molding a tamper evident closure having a top, an annular skirt depending from the top, and a breakaway band secured to an underside of the skirt by a plurality of bridges. The apparatus includes a mold frame, a cavity portion releasably secured to the frame and configured for forming an outer surface of the closure, and a core portion nestable into the cavity portion and mounted on the frame for reciprocal axial movement relative to the cavity portion. A slide portion is mounted to the frame for reciprocal movement transverse to the axial movement of the core portion between a closed position and an open position, and a stripper device is located on the frame for disengaging molded closures retained on the slide portion as the slide portion moves from the closed position to the open position.

An important feature of the present apparatus is that the stripper device disengages molded closures from the slide portion at the completion of each molding cycle. This feature is particularly beneficial when producing closures having a radially projecting flange formation on the breakaway band, wherein the flanges have the tendency to become stuck in either half of the mold slide. In this manner, production volume is increased, and less labor is involved in clearing the slides of retained closures.

Another feature of the present apparatus is that a multiple part core portion is employed to form both the anti-backoff formations at the base of the closure skirt, as well as the breakaway band. The core portion includes an axially rotating core of the type used in an unscrewing mold, a tubular core sleeve slidable relative to the rotatable core and a stationary core relative to which the axially rotatable core and the core sleeve move axially. The tubular core sleeve has an upper end configured for forming an interior surface of an anti-backoff ring into the interior surface of a bottom edge of the skirt.

More specifically, in another embodiment, the present apparatus provides an apparatus for molding a tamper evident closure having a top, an annular skirt depending from the top, an anti-backoff formation in an interior surface of a lower edge of the skirt, and a breakaway band secured to an underside of the skirt by a plurality of bridges. A radially projecting flange is provided on the breakaway band. The apparatus includes a mold frame, a cavity portion releasably secured to the frame and configured for forming an outer surface of the closure, and a core portion nestable into the cavity portion and mounted on the frame for reciprocal axial movement relative to the cavity portion. The core portion includes an axially rotatable core and a tubular core sleeve slidable relative to the rotatable core. Also included is a slide portion mounted to the frame for reciprocal movement transverse to the axial movement of the core portion between a closed position and an open position.

BRIEF DESCRIPTION OF THE DRAWINGS

FIG. 1 is a front elevational view of the closure of the invention shown exploded away from the neck of the container shown in section;

FIG. 2 is a fragmentary vertical sectional view of the closure of the invention taken along the line 2—2 of FIG. 1 and in the direction indicated;

FIG. 5 is a front elevational view of the core portion of the present molding apparatus;

FIG. 6 is a schematic front elevational view of an alternate embodiment of the core portion of the present molding apparatus, shown in the closed position;

FIG. 7 is a schematic front elevational view of an alternate embodiment of the core portion of the present molding apparatus, shown in the open position;

FIG. 8 is a schematic front elevational view of a second alternate embodiment of the core portion of the present molding apparatus, shown in the closed position; and FIG. 9 is a schematic front elevational view of a second alternate embodiment of the core portion of the present molding apparatus, shown in the open position.

DETAILED DESCRIPTION OF THE PREFERRED EMBODIMENT

Figure 3:
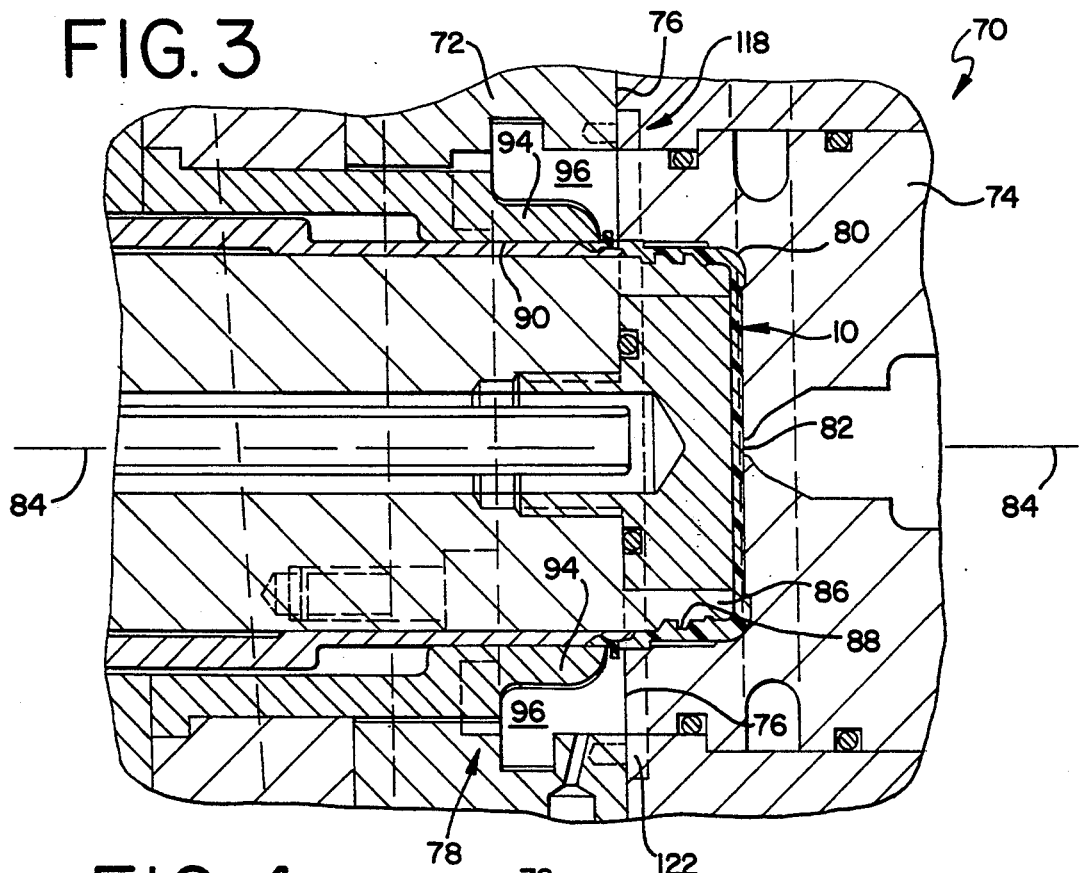
FIG. 3 is a fragmentary vertical sectional view of the present molding apparatus, shown in a molding position.

Referring now to FIG. 1, a closure of the type manufactured by the present apparatus is designated generally 10, and is exploded away from upon a partially shown container generally designated 12. The container 12 has a shoulder portion 14 including a vertically projecting tubular neck or finish portion 16 having a anti-backoff ring 18 integral therewith. The ring 18 has a plurality of radially outwardly projecting tooth or ratchet formations 20. The precise number, placement and spacing of the formations 20 may vary with the particular application and are more specifically disclosed in U.S. Pat. No. 4,913,299, which is incorporated by reference. The neck portion 18 is also provided with a helical thread 22 which is integrally formed therewith.

An annular projecting shoulder or breaker ledge 24 is disposed beneath the level of the thread 22 as well as the anti-backoff ring 18. The ledge 24 has a generally radially tapering configuration and is provided to engage a tamper evident breakaway band as will be described below. The container 12 is preferably manufactured out of a polymeric material which is thermoformable, including, but not restricted to, polyethylene or polypropylene.

The closure 10 is generally configured as a cap having a generally planar top portion 26 with an outer peripheral edge 28 and a depending annular skirt portion 30 depending from the edge 28. An upper sealing member or gasket (not shown) may be located on an underside of the top portion 26 as is well known in the art.

Referring now to FIGS. 1 and 2, the skirt portion 30 includes an outer face 32, an inner face 34 and a lower edge 36. The inner face 34 is provided with integrally formed helical threads 38 which are designed to matingly engage the threads 22 of the container 12. The outer face 32 may be provided with a plurality of vertical ribs 40 to allow the closure 10 to be installed upon a container by automatic capping equipment, as well as to facilitate gripping or manipulation by the user.

The lower edge 36 of the closure 10 is provided with a plurality of spaced, open-bottomed recess formations 42 which are designed to matingly engage the ratchet formations 20 of the ring 18, as well as to assist the removal of the closure from the mold during manufacturing. The recess formations 42 function as an anti-backoff mechanism, and in the preferred embodiment, are provided around the entire lower edge 36, although the exact number and spacing of recesses 42 may vary with the application.

The closure 10 is preferably molded of a lightweight plastic material which is flexible, squeezable and resiliently deformable. Thus, when the closure is closed upon the container, upon opening, the flexibility of the closure allows the recess formations 42 to ride over the ratchet formations 20 for release of the closure. Despite its deformability, the closure 10 has a "memory", in that once the user ceases the squeezing action, the closure 10 immediately resumes its original configuration.

A breakaway band 44 is secured in slightly spaced relationship to the lower edge 36 of the skirt 30 by a plurality of generally vertically projecting bridges 46 (best seen in FIG. 8) located on an upper surface 48 of the band. It is preferred that the bridges 46 are integrally joined at lower ends to the breakaway band 44, and at upper ends to the lower edge 36 of the skirt 30.

The bridges 46 are relatively thin in cross-section in comparison to the cross-sectional width of the band 44. Although they are depicted as being generally cuboidal, the bridges 46 may be provided in any desired shape which will suit a given application. The bridges 46 are disposed about the band 44 in spaced arrangement to facilitate separation of the band from the skirt 30 upon the initial opening of the closure 10. The specific number and spacing of the bridges 46 may change depending on the particular closure and the materials employed. It is also preferred for operational purposes that the bridge formations 46 be disposed on the upper surface 48 of the breakaway band 44 to engage the lower surface 36 of the skirt 30 at the approximate midpoint.

An annular flange 50 incorporates the upper surface 48 of the breakaway band 44 and projects generally radially away from the container neck 16. In the preferred embodiment, the flange 50 is provided with a vertical thickness on The order of 0.025 to 0.035 inches, with 0.030 inches being preferred. These dimensions have been found to provide optimum strength for the amount of material used. A vertically depending leg portion 52 is integrally fixed to the flange 50 to generally define an inverted "L" shape of the breakaway band 44.

The band 44 also has an outer surface 54 and an inner surface 56. An inwardly projecting, radiused annular bead 58 is provided on the inner surface 56 and is integrally joined to the leg portion 52. The bead 58 is vertically spaced below the flange 50 by a hinge portion 60 having a relatively thin cross-section, preferably in the approximate range of 0.010 to 0.035 inches. The hinge portion 60 is dimensioned to provide sufficient flexibility to permit the band 44 to clear the breaker ledge 24 and avoid frictional interference commonly generated during closure application, while having sufficient rigidity to support the bead 58 and the flange 50. The band 44 is retained on the container 12 through the engagement of the bead 58 against the breaker ledge 24.

A significant feature of the closure 10 is the provision of a plurality of support formations for preventing distortion of the breakaway band during application of the closure upon the container. In the preferred embodiment, the support formations take the form of ribs or gussets 62 which are generally triangular in shape, and integrally join the underside of the flange 50 with the outer surface 54 of the breakaway band 44. A generally horizontally disposed, upper edge 64 of each gusset engages the flange 50 and a vertical edge 66 engages the outer surface 54 of the breakaway band 44.

Figure 4:
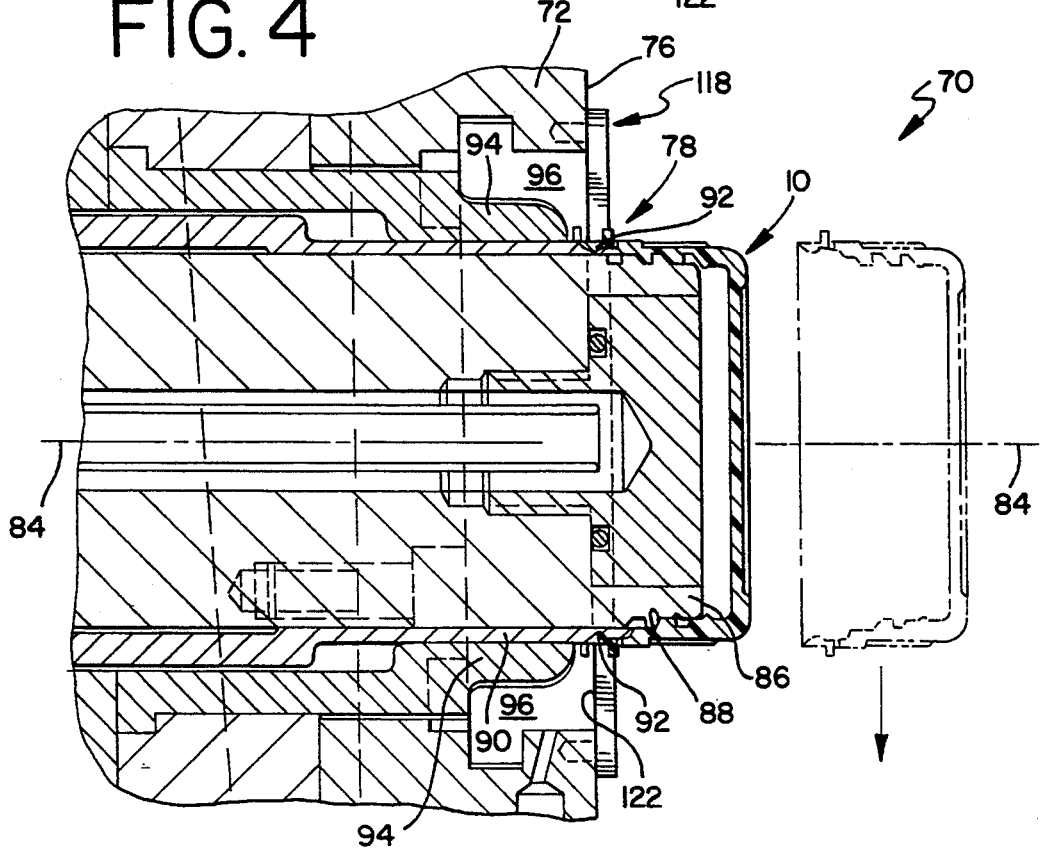
FIG. 4 is a fragmentary vertical sectional view of the present molding apparatus, shown in a release position.

Referring now to FIGS. 3–5, the present injection molding apparatus is depicted and is generally designated 70. The apparatus 70 is commonly classified as an unscrewing type, however it is contemplated that the improvements described below may be equally beneficial with a so-called stripper type of molding apparatus (not shown), as is known in the art. In order to injection mold the closure 10 in economically efficient quantities, the apparatus 70 has been provided with special features for molding in a single step closures having the breakaway band 44 as well as the anti-backoff formations 42.

More specifically, the present molding apparatus 70 includes a frame 72 which is conventional in the molding art, and is connected to plastic feed and heating components, hydraulic power cylinders and electronic controls (not shown) as are common to conventional molding apparatuses and are well known to injection molders. The frame 72 is shown oriented to operate in a generally horizontal relationship along a longitudinal axis relative to a substrate (not shown), such as a shop floor, upon which the apparatus 70 rests. A cavity portion 74 is releasably secured to the frame 72, such as by fasteners to enable the same apparatus 70 to mold a variety of products. The cavity or "female" portion 74 is configured for forming the top 26 and the outer surface 32 of the closure 10. A generally planar rear edge of the cavity portion partially defines a parting line 76 which separates the cavity portion 74 from a core portion 78 described below.

Opposite the cavity portion 74, the core portion 78 is provided and is configured to be nestable into the cavity portion save for an interim cavity 80. Molten plastic is injected into the cavity 80 through a gate 82 to form the closure 10. Designated the "male" half of the molding apparatus 70, the core portion 78 forms the inner surface 34 and an underside of the top 26 of the closure 10. The core portion 78 is mounted on the frame 72 for reciprocal axial movement relative to the cavity portion. In fact, as is common with such devices, both the cavity portion 74 and the core portion 78 are reciprocally movable along the longitudinal axis designated 84.

In the preferred embodiment, the core portion 78 is provided in three parts for enabling the molding of the closure 10 having both the breakaway band 44 and the anti-backoff recesses 42. The three part core portion 78 includes an axially rotatable core 86 which has an outer peripheral end 88 configured to form the inner surface of the closure 10 from the top 26 to the bottom 36 of the skirt 30. A tubular core sleeve 90 forms the second part of the core portion 78 and is slidable axially relative to the rotatable core 86, and is also reciprocally movable along the longitudinal axis 84. In diametrical dimension, the tubular core sleeve is journalled about the rotatable core 86. The tubular core sleeve 90 has a shaped upper end 92 with a notched configuration for forming the anti-backoff recesses 42 into the interior surface 34 of the bottom edge of the skirt 30. Also included in the core portion 78 is a stationary core 94 which is secured to the frame 72 and relative to which the axially rotatable core 86 and the core sleeve 90 are movable reciprocally along the longitudinal axis 84.

The inclusion of the radially projecting flange 50 into the closure 10 requires that a slide portion 96 be provided for proper molding. The slide portion 96 is mounted to the frame 72 for reciprocal movement transverse to the axial movement of the core portion 78 between a closed position and an open position.

Referring now to FIG. 5, in the preferred embodiment, the slide portion 96 includes first and second slide members 98 and 100 which are basically mirror images of each other. Each slide member 98, 100 has an inner edge 102 which is machined to define a cavity for half of the flange 50 of the closure 10. The inner edges 102 meet at a centrally located parting line 104 which defines a plane generally parallel to the longitudinal axis 84 of the molding apparatus 70. A transverse track 106 is defined by the frame 72 in which the slide members 98, 100 are reciprocally slidable. At an outer edge 108 of each slide member 98, 100 is a notch 110. Also included on the frame 72 are a pair of wedges 112, 114 which project along the axis 84 and are each provided with an angled surface 116 dimensioned to slidably engage the corresponding notch 110 of one of the slide members 98, 100.

A stripper device, generally designated 118, is featured on the present molding apparatus 70 for dislodging stuck closures 10 from the slide members 98, 100 after each molding cycle, as the slide members move from a closed position (best seen in FIG. 5) to an open position in which the members 98, 100 are displaced laterally along the tracks 106 in the direction of the arrows 120. The stripper device 118 operates in conjunction with the slide members 98, 100, and as such functions in a transverse direction relative to the longitudinal axis 84. In the preferred embodiment, the stripper device 98, 100 takes the form of at least one and preferably two stripper bars 122 mounted to the frame 72, such as by fasteners 124 or other suitable attachment, to span the track 106. Each stripper bar 122 is disposed in a transverse orientation to the track 106 to engage closures 10 retained on the corresponding slide member 98, 100 approximately midway between the closed position and the open position. Thus, as each slide member 98, 100 moves gradually away from the axially rotating core 86 and achieves the open position, any closures 10 retained by either slide member will contact the corresponding stripper bar 122 and be knocked off (best seen in phantom in FIG. 4), and will fall into a waiting storage container such as a corrugated shipping carton (not shown).

Referring now to FIGS. 6–7, an alternate embodiment of the molding apparatus 70 shown in FIGS. 6–7 is generally designated 170. Components of the apparatus 170 which are identical to the components of FIGS. 3–5 are designated with identical reference numerals. The apparatus 170 is substantially similar to the apparatus 70, with the major exception being that the apparatus 170 is shown as a multi-cavity mold, where the apparatus 70 is shown as a single cavity mold. In the apparatus 170 there are two cavity and core assemblies (collectively designated "cavities") of the type depicted in FIGS. 3 and 4, although it is contemplated that the present invention, in any of its embodiments, may be used with multiple cavity molds having as many as 32 or more cavities. In FIG. 6, two cavities are shown in the closed position, and in FIG. 7, the same two cavities are shown in the closed position. The slide members are designated 98, 100 and the wedges 112, 114 have been omitted only for purposes of clarity.

In the embodiment of FIGS. 6 and 7, there are adjacent, vertically-oriented cavities which share a common stripper bar 172. The stripper bar 172 is mounted upon the frame 72 to be substantially perpendicular to the parting line 104 between the two slide members 98, 100 and also to be generally parallel with the direction of reciprocal travel of the slide members. In addition, the stripper bar 172 has a length such that it is substantially flush with the inner edge 102 of the slide members 98, 100 of both of the adjacent slide assemblies 96 when the slide assemblies 96 are in the closed position. Additional and relatively shorter stripper bars 174 are located diametrically opposite the ends 176, 178 of the stripper bar 172. The bar 172 is secured to the frame 72 by the fastener 182, and the shorter bars 174 are secured thereto by the fasteners 184. The fasteners 182, 184 are preferably threaded bolts, however other types of fasteners are contemplated. As the slide members 98, 100 separate during the molding cycle in the direction 120, the ends 176, 178 of the stripper bar 172, as well as the end 180 of the shorter stripper bar 174 project into the path of the reciprocating slide members 98, 100. Thus, closures 10 which remain stuck to the slide members 98, 100 will be dislodged by the stripper bars 172, 174.

Referring now to FIGS. 8–9, another alternate embodiment of the present molding apparatus is generally designated 270. Components of the apparatus 270 which are identical to the components of FIGS. 3–7 are designated with identical reference numerals. The major difference between the embodiments of FIGS. 6–7 and FIGS. 8–9 is that in the latter embodiment there are two centrally located stripper bars 272, 274 instead of one. Both of the stripper bars 272, 274 are fastened to the frame 72 such that they are in spaced parallel relationship to each other and to the slide members 98, 100. In all other respects, the apparatus 270 operates in the same manner as the apparatus 170, with respective ends 276, 278 of the bars 272, 274, as well as ends 280 of diametrically opposed shorter bars 282 engaging any closures 10 retained on the slide members 98, 100. The bars 272, 274 as well as the bars 282 are preferably secured to the frame 72 by threaded fasteners 284. However, the use of other suitable fastening devices is contemplated.

In operation, and referring to FIGS. 3–5, a typical molding cycle begins with the cavity portion 74 and the core portion 78 contacting each other along the parting line 76. Molten plastic is injected through the gate 82 into the interim cavity 80. The plastic fills the entire cavity 80, including the parts thereof configured to become the bridges 46, the breakaway band 44, and the anti-backoff recesses 42, the latter formed by the tubular core 90. After approximately 3 to 15 seconds, the plastic cools and, the molding apparatus 70, 170, 270 separates at the parting line 76. The cavity portion 74 is axially retracted and is not used again until the next cycle.

Next, the rotating core 86 begins to rotate without moving axially, which action causes the closure 10 to unscrew from the core. As the core 86 completes its rotations, the rotating core 86, the slide portion 96 and the tubular core 90 move forward axially a distance on the order of $\frac{1}{8}''$, which is sufficient for the slide portion and the annular bead 58 of the closure 10 to clear the stationary core 94.

As soon as the closure 10 is disengaged from the rotating core 86 and the stationary core 94, the slide device 96 is cammed open through engagement on the wedges 112. If a closure remains lodged in either of the slide members 98, 100, then the closure will engage one of the stripper bars to disengage the closure as the slide members diverge. The most common location of retention of the closures 10 is the area of the annular flange 50 where it is engaged in the inner edges 102 of the slide members 98, 100. Once the slide members 98, 100 have totally diverged to the open position, the cavity and core portions 74, 78 become reassembled automatically to begin the next cycle. Should the molder decide that closures 10 are to be made without the anti-backoff formations 42, the tubular core 90 may be eliminated from the apparatus 70.

Thus, the present molding apparatus features a three part core for molding closures having anti-backoff recesses as well as a tamper evident breakaway band. If desired, the tubular core may be eliminated, and a straightforward tamper evident closure may be molded. In addition, the stripper devices eliminate any retained or stuck closures on the slide members, which reduces total production time over conventional molding apparatuses.

While a particular embodiment of the apparatus for molding tamper evident closures of the invention has been shown and described, it will be appreciated by those skilled in the art that changes and modifications may be made thereto without departing from the invention in its broader aspects and as set forth in the following claims.

What is claimed is:

1. An apparatus for molding a tamper evident closure having a top, an annular skirt depending from the top, and a breakaway band secured to an underside of the skirt by a plurality of bridges, said apparatus comprising:

a mold frame;

a cavity portion releasably secured to said frame, said cavity portion configured for forming an outer surface of the closure;

a core portion nestable into said cavity portion and mounted on said frame for reciprocal axial movement relative to said cavity portion, said core portion configured for forming an inner surface and an underside of the top of the closure;

a slide portion mounted to said frame for reciprocal movement transverse to said axial movement of said core portion between a closed position and an open position, said slide portion configured for forming a flange of the closure;

said cavity portion, said core portion and said slide portion forming a molding cavity for forming the closure;

said core portion, said cavity portion and said slide portion being oriented when said slide is in said closed position to form the closure as a molding substance is introduced thereto;

said slide portion moves into said open position to allow the closure to disengage from said cavity portion and said core portion; and at least one stripper bar mounted to said frame in operational relationship to said slide portion and being substantially parallel with the direction of reciprocal travel of said slide portion, said stripper bar disengages molded closures retained on said slide portion as said slide portion moves from said closed position to said open position.

2. The apparatus as defined in claim 1 wherein said slide portion includes a first slide member and a second slide member, said first and second slide members being reciprocally slidable relative to each other between said closed position and said open position, said stripper bar including first and second stripper members, one of said stripper members being mounted to said frame in operational relationship with a corresponding one of said first and second slide members.

3. The apparatus as defined in claim 2 wherein said stripper members are mounted on said frame in generally parallel relationship to the direction of reciprocal travel of said slide portion.

4. The apparatus as defined in claim 1 wherein said core portion includes an axially rotatable core, and a tubular core sleeve slidable relative to said rotatable core.

5. The apparatus as defined in claim 4 wherein said tubular core sleeve has an upper end configured for forming an interior surface of a plurality of anti-backoff formations into said interior surface of the skirt.

6. The apparatus as defined in claim 4 wherein said core portion further includes a stationary core which is secured to said frame and is relative to which said axially rotatable core and said core sleeve move axially.

7. The apparatus as defined in claim 1 wherein said molding apparatus is an unscrewing mold, and said core portion includes an axially rotatable core.

8. An apparatus for molding a tamper evident closure having a top, an annular skirt depending from the top, an anti-backoff formation in an interior surface of a lower edge of the skirt, and a breakaway band secured to an underside of the skirt by a plurality of bridges, said apparatus comprising:

a mold frame;

a cavity portion releasably secured to said frame, said cavity portion configured for forming an outer surface of the closure;

a core portion nestable into said cavity portion and mounted on said frame for reciprocal axial movement relative to said cavity portion, said core portion includes an axially rotatable core, and a tubular core sleeve slidable relative to said rotatable core, said core portion configured for forming an inner surface and an underside of the top of the closure;

a slide portion mounted to said frame for reciprocal movement transverse to said axial movement of said core portion between a closed position and an open position, said slide portion configured for forming a flange of the closure;

said cavity portion, said core portion and said slide portion forming a molding cavity for forming the closure;

said core portion, said cavity portion and said slide portion being oriented when said slide is in said closed position to form the closure as a molding substance is introduced thereto;

said slide portion moves into said open position to allow the closure to disengage from said cavity portion and said case portion; and at least a first and second stripper bar mounted to said frame in operational relationship to said slide portion and being substantially parallel with the direction of reciprocal travel of said slide portion, said first and second stripper bars being elongated and equal in length, said stripper bar disengages molded closures retained on said slide portion as said slide portion moves from said closed position to said open position.

9. The apparatus as defined in claim 8 wherein said tubular core sleeve has an upper end configured for forming the anti-backoff formation.

10. The apparatus as defined in claim 8 wherein said core portion further includes a stationary core relative to which said axially rotatable core and said core sleeve move axially.

* * * * *